(12) United States Patent
Kim et al.

(10) Patent No.: US 9,001,772 B2
(45) Date of Patent: Apr. 7, 2015

(54) APPARATUS AND METHOD FOR MANAGING ACCESS STATE OF MOBILE STATION FOR GROUP COMMUNICATION SERVICE IN WIRELESS COMMUNICATION SYSTEM

(75) Inventors: Han-Seok Kim, Seoul (KR); Gyou-Hwan Kim, Suwon-si (KR); Woo-Jae Kim, Suwon-si (KR); Seongkwan Kim, Suwon-si (KR); Jai-Jin Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 13/991,594

(22) PCT Filed: Dec. 16, 2011

(86) PCT No.: PCT/KR2011/009728
§ 371 (c)(1),
(2), (4) Date: Jun. 4, 2013

(87) PCT Pub. No.: WO2012/081934
PCT Pub. Date: Jun. 21, 2012

(65) Prior Publication Data
US 2013/0258988 A1 Oct. 3, 2013

(30) Foreign Application Priority Data
Dec. 17, 2010 (KR) .................. 10-2010-0129613

(51) Int. Cl.
*H04W 4/00* (2009.01)
*H04L 12/28* (2006.01)
*H04L 12/56* (2006.01)
*H04W 4/10* (2009.01)
*H04W 72/00* (2009.01)
*H04W 72/12* (2009.01)

(52) U.S. Cl.
CPC .............. *H04W 72/005* (2013.01); *H04W 4/10* (2013.01); *H04W 72/121* (2013.01)

(58) Field of Classification Search
CPC ..... H04W 80/04; H04W 88/06; H04W 28/04; H04W 72/04; H04L 45/16; H04L 12/185
USPC ......................................... 370/328, 329, 390
See application file for complete search history.

(56) References Cited

U.S. PATENT DOCUMENTS

| | | |
|---|---|---|
| 2002/0037736 A1 | 3/2002 | Kawaguchi et al. |
| 2005/0071631 A1 | 3/2005 | Langer |
| 2006/0264218 A1 | 11/2006 | Zhang et al. |
| 2010/0074133 A1 | 3/2010 | Kim et al. |
| 2010/0278091 A1 * | 11/2010 | Sung et al. .................... 370/312 |

* cited by examiner

*Primary Examiner* — Ronald Abelson
(74) *Attorney, Agent, or Firm* — Jefferson IP Law, LLP

(57) ABSTRACT

An apparatus and a method for managing an access state of a terminal for a group communication service in a wireless communication system are provided. In a method for operating a terminal for a group communication service in a wireless communication system, a bandwidth ranging message is transmitted to a base station in an idle state. The terminal is allocated an uplink resource from the base station. A message for access state transfer including a multicast Connection IDentifier (CID) is generated. The message for access state transfer is transmitted to the base station via the allocated uplink resource.

15 Claims, 7 Drawing Sheets

US 9,001,772 B2

APPARATUS AND METHOD FOR MANAGING ACCESS STATE OF MOBILE STATION FOR GROUP COMMUNICATION SERVICE IN WIRELESS COMMUNICATION SYSTEM

TECHNICAL FIELD

The present invention relates to a group communication service.

BACKGROUND ART

For one cell to support large capacity group communication of thousands of people or more via a group communication service such as Push-To-Talk (PTT) or Push-To-All (PTA) in a WiMAX network, the following two requirements are needed. For convenience in description, the PTA as a representative of a group communication service is exemplarily described.

(1) A group communication packet should be transmitted to a terminal in a multicast method on a radio link. That is, all terminals should receive one time of packet transmission by a base station.

(2) A terminal should receive a group communication packet in an idle state. Since a terminal uses a radio resource and a resource inside a base station in an awake state, the terminal should maintain an idle state to avoid this.

Currently, various kinds of services use a Keep Alive method in order to manage an access state of a terminal. However, since a terminal should have a Connection ID (CID) in order to transmit a packet for Keep Alive (that is, a packet for access state transfer) and an idle state is a state to which a CID has not been allocated, the terminal should make a transition to an awake state to obtain a CID. This is contradictory to a requirement that the terminal should maintain an idle state for large capacity group communication. In addition, since a Keep Alive packet is transmitted in an awake state and so the number of users of group communication is limited to a level of hundreds of people regardless of whether a group communication service is a multicast method, it is difficult to support the large capacity group communication service where more than thousands of people perform reception simultaneously.

When a multicast group communication starts/ends or a handover is performed, a PTA path for packet transmission belonging to relevant group communication is established/released between a Base Station (BS) to which a relevant terminal belongs and an Access Service Network Gate Way (ASN-GW). At this point, when a certain abnormal state occurs, a mismatch may be generated to path establishment/release states managed by the BS and the ASN-GW, respectively. To determine whether this mismatch exists and resolve this mismatch, whether abnormality is generated to a transmission path establishment/release state between the BS and the ASN-GW should be known, and for this purpose, the BS should monitor whether a group communication receive terminal exists in a relevant cell. Currently, for this monitoring, a terminal directly communicates with a PTA server or an ASN-GW to perform a Keep Alive procedure. However, in the case where the terminal directly communicates with the PTA server or the ASN-GW to perform the Keep Alive procedure, as a group communication scale increases, a big load may be applied to the PTA server or the ASN-GW.

DISCLOSURE OF INVENTION

Solution to Problem

An aspect of the present invention is to address at least the above-mentioned problems and/or disadvantages and to provide at least the advantages described below. Accordingly, an aspect of the present invention is to provide an apparatus and a method for managing an access state of a terminal for a group communication service in a wireless communication system.

Another aspect of the present invention is to provide an apparatus and a method for performing a Keep Alive procedure between a terminal and a base station in an idle state, and informing a PTA server or an ASN-GW of an abnormal phenomenon only when the abnormal phenomenon occurs in management of a transmission path for group communication to reduce an amount of a load applied to the PTA server and the ASN-GW in a wireless communication system that supports a group communication service in a multicast method.

In accordance with an aspect of the present invention, a method for operating a terminal for a group communication service in a wireless communication system is provided. The method includes transmitting a bandwidth ranging message to a base station in an idle state, being allocated an uplink resource from the base station, generating a message for access state transfer including a multicast Connection IDentifier (CID), and transmitting the message for access state transfer to the base station via the allocated uplink resource.

In accordance with another aspect of the present invention, a method for operating a base station for a group communication service in a wireless communication system is provided. The method includes receiving a bandwidth ranging message from a terminal in an idle state, allocating an uplink resource to the terminal, and receiving a message for access state transfer including a multicast Connection IDentifier (CID) via the allocated uplink resource from the terminal.

In accordance with still another aspect of the present invention, a method for operating a base station controller for a group communication service in a wireless communication system is provided. The method includes being informed via a Push-To-All (PTA) path non-set state message from the base station that a group communication path between the base station and the base station controller for a multicast Connection IDentifier (CID) is in a non-set state, transmitting a PTA path establishment message including the multicast CID to the base station, and inserting the multicast CID into a multicast CID list managed by the base station controller with respect to the group communication path between the base station and the base station controller to establish the group communication path between the base station and the base station controller with respect to the multicast CID.

In accordance with yet another aspect of the present invention, a method for operating a group communication server for a group communication service in a wireless communication system is provided. The method includes being informed via a Push-To-All (PTA) path non-set state message from a base station controller that a group communication path between the base station controller and the group communication server for a group communication IDentifier (ID) is in a non-set state, transmitting a PTA path establish message including the group communication ID to the base station controller, and inserting the group communication ID into a group communication ID list managed by the group communication server with respect to the group communication path between the base station controller and the group communication server to establish the group communication path between the base station controller and the group communication server with respect to the group communication ID.

In accordance with further another aspect of the present invention, an apparatus of a terminal for a group communication service in a wireless communication system is provided. The apparatus includes a transmitter for transmitting a bandwidth ranging message to a base station in an idle state, a group communication manager for being allocated an uplink resource from the base station, and a message generator for generating a message for access state transfer including a multicast Connection IDentifier (CID), wherein the transmitter transmits the message for access state transfer to the base station via the allocated uplink resource.

In accordance with still further another aspect of the present invention, an apparatus of a base station for a group communication service in a wireless communication system is provided. The apparatus includes a receiver for receiving a bandwidth ranging message from a terminal in an idle state, and a group communication manager for allocating an uplink resource to the terminal, wherein the receiver receives a message for access state transfer including a multicast Connection IDentifier (CID) from the terminal via the allocated uplink resource.

In accordance with still yet another aspect of the present invention, an apparatus of a base station controller for a group communication service in a wireless communication system is provided. The apparatus includes a receiver for being informed via a Push-To-All (PTA) path non-set state message from a base station that a group communication path between the base station and the base station controller with respect to a multicast Connection IDentifier (CID) is in a non-set state, a transmitter for transmitting a PTA path establish message including the multicast CID to the base station, and a group communication manager for inserting the multicast CID into a multicast CID list managed by the base station controller with respect to the group communication path between the base station and the base station controller to establish the group communication path between the base station and the base station controller with respect to the multicast CID.

In accordance with still yet further another aspect of the present invention, an apparatus of a group communication server for a group communication service in a wireless communication system is provided. The apparatus includes a receiver for being informed via a Push-To-All (PTA) path non-set state message from a base station controller that a group communication path between the base station controller and the group communication server with respect to a group communication IDentifier (ID) is in a non-set state, a transmitter for transmitting a PTA path establishment message including the group communication ID to the base station controller, and a group communication manager for inserting the group communication ID into a group communication ID list managed by the group communication server with respect to the group communication path between the base station controller and the group communication server to establish the group communication path between the base station controller and the group communication server with respect to the group communication ID.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

BEST MODE FOR CARRYING OUT THE INVENTION

Figure 1:
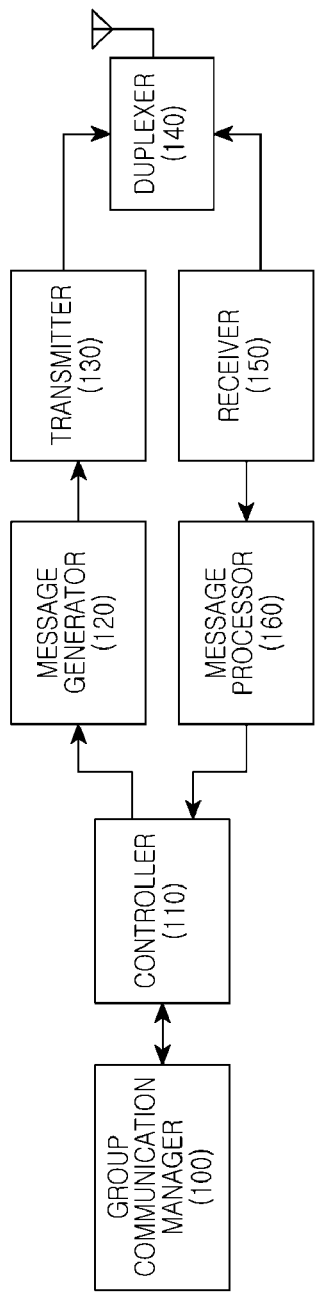
FIG. 1 is a block diagram illustrating an apparatus of a terminal (or a base station, or a base station controller, or a PTA server) for a group communication service in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an alternative for managing an access state of a terminal for a group communication service in a wireless communication system.

In the following description, though the present invention is described using a PTA, which is a representative of a group communication service, as an example for convenience in description, the present invention is applicable to all group communication services such as a PTT, where one cell supports large capacity group communication of thousands of people or more. In the following description, a PTA terminal, a PTA server, and a PTA path denote a terminal, a server, and a path applied to a PTA, respectively.

Meanwhile, a WiMAX network uses a CID as an MAC connection identifier and the CID has a unique value inside a base station without discrimination of an uplink and a downlink. When MAC connection for group communication is established, a CID for discriminating the MAC connection is uniquely determined, so that a base station and a CID value may discriminate relevant group communication via the CID value.

In case of a general CID for unicast, when the terminal makes a transition to an idle state, all CIDs that belong to a terminal are collected and used by a different terminal. In contrast, since a plurality of terminals use a CID for multicast group communication in common in a multicast method, even when one of terminals makes a transition to an idle state, a relevant CID is continuously used by terminals including the terminal that has made a transition to an idle state and a base station that belong to a relevant group communication. Therefore, under a unicast environment, since a terminal in an idle state has no CID for Keep Alive packet transmission, the terminal should make a transition to an awake state in order to obtain a CID. In contrast, under a multicast environment, when a CID for multicast or corresponding information (for example, a certain value one-to-one mapped to a CID) is used, the terminal does not need to make a transition to an awake state.

Meanwhile, when a multicast group communication starts/ends or a handover is performed, a PTA path for packet transmission belonging to relevant group communication is establishment/released between a Base Station (BS) to which a relevant terminal belongs and an Access Service Network Gate Way (ASN-GW). At this point, a base station according to an exemplary embodiment of the present invention defines and manages a flag representing whether to establish a PTA path with respect to each CID allocated for group communication. Therefore, when each terminal belonging to group communication informs a base station of CID information corresponding to the group communication to which the terminal belongs via a Keep Alive procedure during a predetermined period, the base station may determine whether a PTA path establishment state is abnormal.

FIG. 1 is a block diagram illustrating an apparatus of a terminal (or a base station, or a base station controller, or a PTA server) for a group communication service in a wireless communication system according to an exemplary embodiment of the present invention.

As illustrated in FIG. 1, the terminal (or the base station, or the base station controller, or the PTA server) includes a group communication manager 100, a controller 110, a message generator 120, a transmitter 130, a duplexer 140, a receiver 150, and a message processor 160.

Referring to FIG. 1, the group communication manager 100 manages an access state of the terminal for the group communication service. More particularly, the group communication manager 100 performs a Keep Alive procedure between the terminal and the base station, and informs the PTA server or the base station controller of an abnormal phenomenon only when the abnormality phenomenon is generated to management of a transmission path for the group communication to reduce an amount of a load applied to the PTA server and the base station controller.

The controller 110 controls an entire transmission/reception operation of the terminal (or the base station, or the base station controller, or the PTA server). More particularly, the controller 110 provides information received from the message processor 160 to the group communication manager 100, and provides information provided from the group communication manager 100 to the message generator 120.

The message generator 120 generates a message to be transmitted under control of the controller 110 and provides the same to the transmitter 130.

The transmitter 130 converts a message or transmission data provided from the message generator 120 into a form for transmission via a radio resource and provides the same to the duplexer 140. For example, the transmitter 130 includes a channel encoding block, a modulation block, an RF transmission block, etc. At this point, the channel encoding block includes a modulator, an interleaver, a channel encoder, etc. In the case where a wireless communication system uses an Orthogonal Frequency Division Multiplexing (OFDM) scheme, the modulation block includes an Inverse Fast Fourier Transform (IFFT) operator for mapping data to each subcarrier. The RF transmission block includes a filter, an RF pre-processor, etc.

The duplexer 140 transmits a transmission signal provided from the transmitter 130 via an antenna and provides a reception signal provided from the antenna to the receiver 150 according to a duplexing scheme.

The receiver 150 recovers data from a signal provided from the duplexer 140 and transfers the same to the message processor 160. For example, the receiver 150 includes an RF reception block, a demodulation block, a channel decoding block, etc. At this point, the RF reception block includes a filter, an RF pre-processor, etc. In the case where a wireless communication system uses an OFDM scheme, the demodulation block includes a Fast Fourier Transform (FFT) operator for extracting data conveyed on each subcarrier, etc. The channel decoding block includes a demodulator, a deinterleaver, a channel decoder, etc.

The message processor 160 decomposes a message received via the receiver 150 and provides the result to the controller 110.

Figure 2:
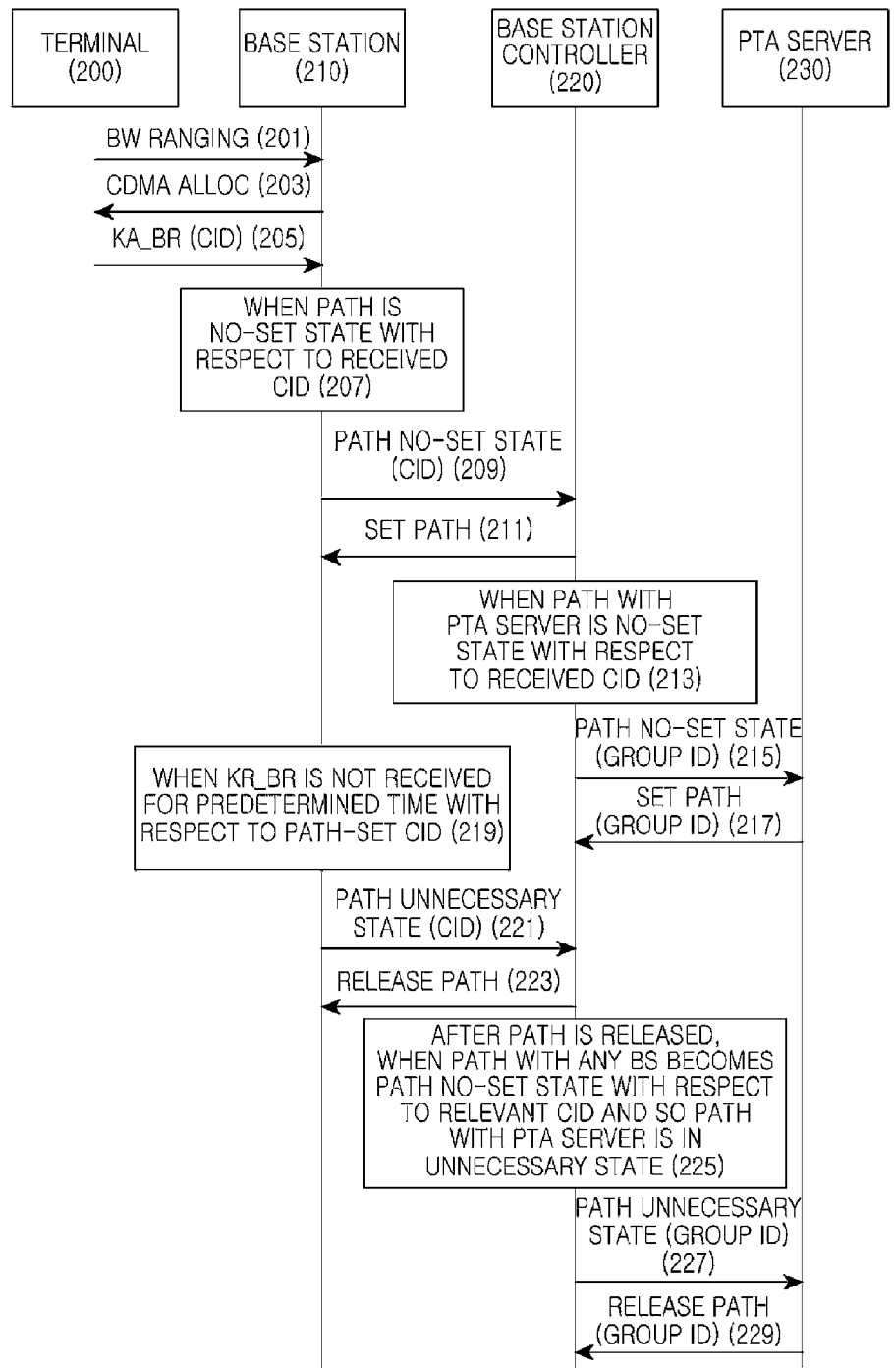
FIG. 2 is a view illustrating an entire signal flow for managing an access state of a terminal for a group communication service in a wireless communication system according to an exemplary embodiment of the present invention.

FIG. 2 is a view illustrating an entire signal flow for managing an access state of a terminal for a group communication service in a wireless communication system according to an exemplary embodiment of the present invention.

Referring to FIG. 2, a terminal 200 periodically generates a bandwidth ranging message and transmits the generated bandwidth ranging message to a base station 210 to request allocation of an uplink resource for transmission of uplink traffic (step 201). Here, the terminal 200 includes both a PTA terminal in an awake state and a PTA terminal in an idle state.

The base station 210 allocates an uplink resource for transmission of uplink traffic to the terminal depending on reception of the bandwidth ranging message, generates a Code Division Multiple Access (CDMA) allocation message including resource allocation information, and transmits the same to the terminal 200 (step 203).

The terminal 200 generates a message for Keep Alive including a CID for multicast PTA of group communication to which the terminal belongs or corresponding information depending on reception of the CDMA allocation message, and transmits the generated message for Keep Alive to the base station 210 via the uplink resource allocated from the base station 210 (step 205). Here, for a method for transmitting a message for Keep Alive, a method for defining a new message and transmitting the same, and a method for transmitting a Bandwidth Request (BR) message defined in the existing WiMAX standard may be used. The former method defines a new message so that the new message may include a CID allocated for multicast PTA or corresponding information, and uses the same. The latter method incorporates a CID allocated for multicast PTA into a BR message and uses the same. Hereinafter, the messages are called a Keep Alive BR (KA_BR) message without discrimination of the two methods for convenience in description. Here, a transmission period of the KA_BR message is established in the base station 210 or the terminal 200 in advance, or the base station 210 may set a transmission period value and informs the terminal 200 of the transmission period via an Uplink Channel Descriptor (UCD) message, or the PTA server 230 may inform the base station 210 and the terminal 200 of a transmission period value set for each group via a call establishment message when establishing a group communication call.

The base station 210 detects that a relevant KA_BR message is a Keep Alive packet for relevant group communication via a CID for multicast PTA or corresponding information included in the KA_BR message depending on reception of the KA_BR message, and determines whether the CID for multicast PTA is included in a list of CIDs for multicast PTA managed by the base station 210 with respect to a PTA path between the base station 210 and the base station controller 220, thereby determining whether a PTA path between the base station 210 and the base station controller 220 with respect to the CID for multicast PTA is in a set state. When the CID for multicast PTA is included in the list of CIDs for multicast PTA managed by the base station 210 with respect to the PTA path between the base station 210 and the base station controller 220, the base station 210 may determine that the PTA path between the base station 210 and the base station controller 220 with respect to the CID for multicast PTA is in a set state. When the CID for multicast PTA is not included in the list of CIDs for multicast PTA managed by the base station 210, the base station 210 may determine that the PTA path between the base station 210 and the base station controller 220 with respect to the CID for multicast PTA is in a non-set state. Though not shown, when the PTA path is in the set state, the base station 210 determines that there is no abnormality in a set state of the PTA transmission path between the base station 210 and the base station controller 220, and ends the algorithm according to an exemplary embodiment of the present invention. When the PTA path is in the non-set state (step 207), the base station 210 determines that there is abnormality in the set state of the PTA transmission path between the base station 210 and the base station controller 220, and transmits a PTA path non-set state message including the CID for multicast PTA to the base station controller 220 to inform that the PTA path between the base station 210 and the base station controller 220 with respect to the CID for multicast PTA is in the non-set state (step 209).

When being informed that the PTA path between the base station 210 and the base station controller 220 with respect to the CID for multicast PTA is in the non-set state, the base station controller 220 transmits a PTA path establishment message including the CID for multicast PTA to the base station 210 to perform a PTA path establishment procedure between the base station 210 and the base station controller 220 with respect to the CID for multicast PTA (step 211). That is, each of the base station 210 and the base station controller 220 inserts the CID for multicast PTA into a list of CIDs for multicast PTA managed by itself with respect to a PTA path between the base station 210 and the base station controller 220. Here, when being informed that the PTA path between the base station 210 and the base station controller 220 with respect to the CID for multicast PTA is in the non-set state, the base station controller 220 determines whether the PTA path between the base station 210 and the base station controller 220 with respect to the CID for multicast PTA is in the set state by determining whether the CID for multicast PTA exists in the list of CIDs for multicast PTA managed by the base station controller 220 with respect to the PTA path between the base station 210 and the base station controller 220, and performs a PTA path establishment procedure between the base station 210 and the base station controller 220 with respect to the CID for multicast PTA only when the PTA path is in the non-set state.

In addition, when being informed that the PTA path between the base station 210 and the base station controller 220 with respect to the CID for multicast PTA is in the non-set state, the base station controller 220 determines whether the PTA path between the base station controller 220 and the PTA server 230 with respect to the CID for multicast PTA is in the set state by determining whether the CID for multicast PTA exists in the list of CIDs for multicast PTA managed by the base station controller 220 with respect to the PTA path between the base station controller 220 and the PTA server 230. When the CID for multicast PTA exists in the list of CIDs for multicast PTA managed by the base station controller 220 with respect to the PTA path between the base station controller 220 and the PTA server 230, the base station controller 220 may determine that the PTA path between the base station controller 220 and the PTA server 230 with respect to the CID for multicast PTA is in the set state. When the CID for multicast PTA does not exist in the list of CIDs for multicast PTA managed by the base station controller 220, the base station controller 220 may determine that the PTA path between the base station controller 220 and the PTA server 230 with respect to the CID for multicast PTA is in the non-set state. Though not shown, when the PTA path is in the set state, the base station controller 220 determines that there is no abnormality in the set state of the PTA transmission path between the base station controller 220 and the PTA server 230, and ends the algorithm according to an exemplary embodiment of the present invention. When the PTA path is in the non-set state (step 213), the base station controller 220 determines that there is abnormality in the set state of the PTA transmission path between the base station controller 220 and the PTA server 230, and transmits a PTA path non-set state message including a group communication ID mapped to the CID for multicast PTA to the PTA server 230 to inform that the PTA path between the base station controller 220 and the PTA server 230 with respect to the group communication ID is in the non-set state (step 215). Here, it is assumed that the base station controller 220 stores and manages mapping information of group communication ID for each CID for multicast PTA.

When being informed that a PTA path between the base station controller 220 and the PTA server 230 with respect to the group communication ID is in the non-set state, the PTA server 230 transmits a PTA path establishment message including the group communication ID to the base station controller 220 to perform a PTA path establishment procedure between the base station controller 220 and the PTA server 230 with respect to the group communication ID (step 217). That is, each of the base station controller 220 and the PTA server 230 inserts the CID for multicast PTA or a group communication ID mapped thereto into a list of CIDs for multicast PTA or a list of group communication IDs managed by itself with respect to the PTA path between the base station controller 220 and the PTA server 230. Here, when being informed that the PTA path between the base station controller 220 and the PTA server 230 with respect to the group communication ID is in the non-set state, the PTA server 230 determines, whether the PTA path between the base station controller 220 and the PTA server 230 with respect to the group communication ID is in the set state by determining whether the group communication ID exists in the list of the group communication IDs managed by the base station controller 220 with respect to the PTA path between the base station controller 220 and the PTA server 230, and performs a PTA path establishment procedure between the base station controller 220 and the PTA server 230 with respect to the group communication ID only when the PTA path is in the non-set state.

Meanwhile, the base station 210 determines whether a PTA path between the base station 210 and the base station controller 220 with respect to the CID for multicast PTA is in an unnecessary state by determining whether a CID for multicast PTA not received during a predetermined transmission period via a KA_BR message from the terminal 200 exists in a list of CIDs for multicast PTA managed by the base station 210 with respect to a PTA path between the base station 210 and the base station controller 220. When a CID for multicast PTA not received during the predetermined transmission period via a KA_BR message from a certain terminal 200 whatsoever exists in the list of CIDs for multicast PTA managed by the base station 210 with respect to the PTA path between the base station 210 and the base station controller 220, the base station 210 may determine that the PTA path between the base station 210 and the base station controller 220 with respect to the CID for multicast PTA is in the unnecessary state. When the PTA path is in the unnecessary state (step 219), the base station 210 determines that there is abnormality in a set state of the PTA transmission path between the base station 210 and the base station controller 220, and transmits a PTA path unnecessary state message including the CID for multicast PTA to the base station controller 220 to inform that the PTA path between the base station 210 and the base station controller 220 with respect to the CID for multicast PTA is in the unnecessary state (step 221).

When being informed that the PTA path between the base station 210 and the base station controller 220 with respect to the CID for multicast PTA is in the unnecessary state, the base station controller 220 transmits a PTA path release message including the CID for multicast PTA to the base station 210 to perform a PTA path release procedure between the base station 210 and the base station controller 220 with respect to the CID for multicast PTA (step 223). That is, each of the base station 210 and the base station controller 220 deletes the CID for multicast PTA from a list of CIDs for multicast PTA managed by itself with respect to the PTA path between the base station 210 and the base station controller 220. Here, when being informed that the PTA path between the base station 210 and the base station controller 220 with respect to the CID for multicast PTA is in the unnecessary state, the base station controller 220 determines whether a PTA path between the base station 210 and the base station controller 220 with respect to the CID for multicast PTA is in a set state by determining whether the CID for multicast PTA exists in a list of CIDs for multicast PTA managed by the base station controller 220 with respect to the PTA path between the base station 210 and the base station controller 220, and performs a PTA path release procedure between the base station 210 and the base station controller 220 with respect to the CID for multicast PTA only when the PTA path is in the set state.

In addition, the base station controller 220 determines whether the PTA path between all base stations and the base station controller with respect to the CID for multicast PTA is released due to performance of the PTA path release procedure between the base station 210 and the base station controller 220 with respect to the CID for multicast PTA, that is, whether the PTA path becomes a path non-set state with any base station whatsoever with respect to a relevant CID for multicast PTA, and so whether a path with the PTA server becomes unnecessary. When determining that the PTA path between all base stations and the base station controller with respect to the CID for multicast PTA has been released (step 225), the base station controller 220 transmits a PTA path unnecessary state message including a group communication ID mapped to the CID for multicast PTA to the PTA server 230 to inform that the PTA path between the base station controller 220 and the PTA server 230 with respect to the group communication ID is unnecessary (step 227).

When being informed that the PTA path between the base station controller 220 and the PTA server 230 with respect to the group communication ID is in an unnecessary state, the PTA server 230 transmits a PTA path release message including the group communication ID to the base station controller 220 to perform a PTA path release procedure between the base station controller 220 and the PTA server 230 with respect to the group communication ID (step 229). That is, each of the base station controller 220 and the PTA server 230 deletes the CID for multicast PTA or a group communication ID mapped thereto from a list of CIDs for multicast PTA or a list of group communication IDs managed by itself with respect to the PTA path between the base station controller 220 and the PTA server 230. Here, when being informed that the PTA path between the base station controller 220 and the PTA server 230 with respect to the group communication ID is in the unnecessary state, the PTA server 230 determines whether the PTA path between the base station controller 220 and the PTA server 230 with respect to the group communication ID is in a set state by determining whether the group communication ID exists in a list of group communication IDs managed by the PTA server 230 with respect to the PTA path between the base station controller 220 and the PTA server 230. When the PTA path is in the set state, the PTA server 230 performs a PTA path release procedure between the base station controller 220 and the PTA server 230 with respect to the group communication ID.

Meanwhile, though the present invention proposes an alternative for using a KA_BR message as a purpose of Keep Alive, the KA_BR message may be used as a purpose of a handover. In this case, a terminal performs cell switching for a handover and then may perform the same procedure as that of FIG. 2.

Figure 3:
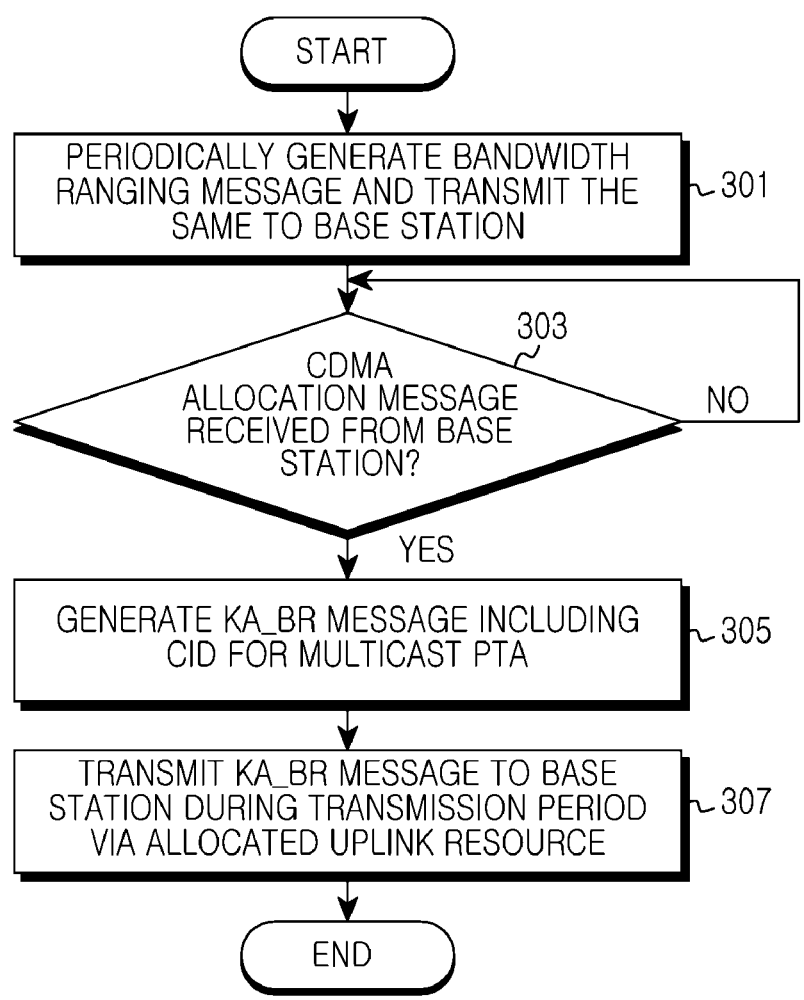
FIG. 3 is a flowchart illustrating a method for operating a terminal for managing an access state of a terminal for a group communication service in a wireless communication system according to an exemplary embodiment of the present invention.

FIG. 3 is a flowchart illustrating a method for operating a terminal for managing an access state of a terminal for a group communication service in a wireless communication system according to an exemplary embodiment of the present invention. Here, the terminal includes both a PTA terminal in an awake state and a PTA terminal in an idle state.

Referring to FIG. 3, the terminal periodically generates a bandwidth ranging message in step 301, and transmits the generated bandwidth ranging message to a base station to request allocation of an uplink resource for transmission of uplink traffic.

The terminal determines whether a CDMA allocation message including allocation information regarding an uplink resource for transmission of uplink traffic is received from the base station in step 303.

When determining that the CDMA allocation message is received from the base station in step 303, the terminal generates a KA_BR message for Keep Alive including a CID for multicast PTA (or corresponding information) of group communication to which the terminal belongs in step 305.

The terminal transmits the generated KA_BR message to the base station during a transmission period via the uplink resource allocated via the received CDMA allocation message in step 307. Here, the transmission period of the KA_BR message may be set in the base station and the terminal in advance, or the base station may set the transmission period value and inform the terminal of the value via a UCD message, or the PTA server may inform the base station and the terminal of the transmission period value set for each group via a call establishment message when setting a group communication call.

After that, the terminal ends the algorithm according to an exemplary embodiment of the present invention.

Figure 4:
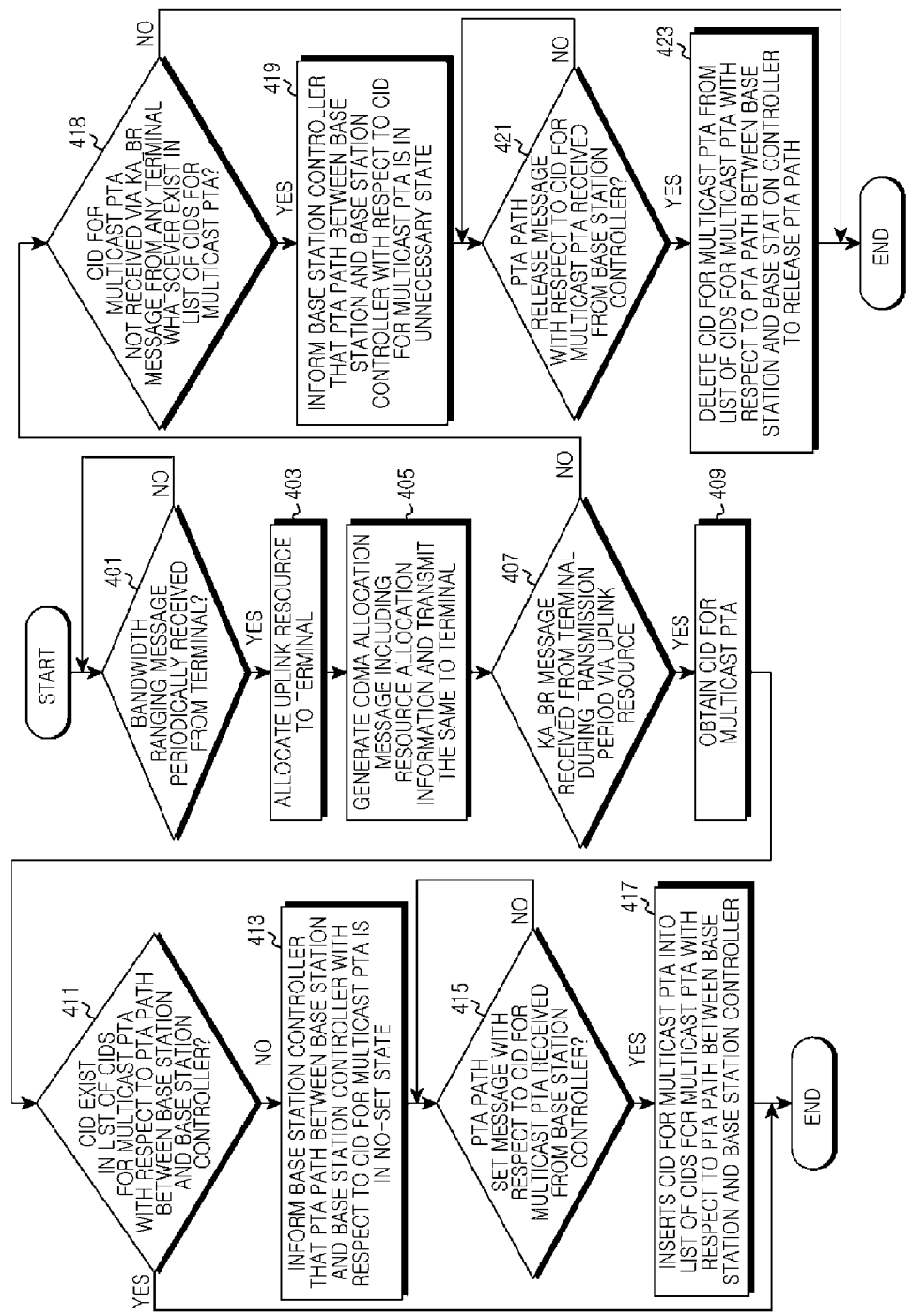
FIG. 4 is a flowchart illustrating a method for operating a base station for managing an access state of a terminal for a group communication service in a wireless communication system according to an exemplary embodiment of the present invention.

FIG. 4 is a flowchart illustrating a method for operating a base station for managing an access state of a terminal for a group communication service in a wireless communication system according to an exemplary embodiment of the present invention.

Referring to FIG. 4, the base station determines whether a bandwidth ranging message for requesting allocation of an uplink resource for transmission of uplink traffic is received from the terminal periodically in step 401. Here, the terminal includes both a PTA terminal in an awake state and a PTA terminal in an idle state.

When determining that the bandwidth ranging message is received from the terminal periodically in step 401, the base station allocates an uplink resource for transmission of uplink traffic to the terminal in step 403, and proceeds to step 405 to generate a CDMA allocation message including relevant resource allocation information and transmit the generated CDMA allocation message to the terminal.

The base station determines whether a KA_BR message is received from the terminal during a transmission period via the uplink resource allocated to the terminal in step 407. Here, the KA_BR message is a message for Keep Alive including a CID for multicast PTA (or corresponding information) of group communication to which the terminal belongs. Here, the transmission period of the KA_BR message may be set in the base station and the terminal in advance, or the base station may set the transmission period value and inform the terminal of the value via a UCD message, or the PTA server may inform the base station and the terminal of the transmission period value set for each group via a call establishment message when setting a group communication call.

When determining that the KA_BR message is received from the terminal during the transmission period via the uplink resource allocated to the terminal in step 407, the base station obtains a CID for multicast PTA (for corresponding information) of the group communication to which the terminal belongs from the received KA_BR message in step 409.

The base station determines whether the obtained CID for multicast PTA exists in a list of CIDs for multicast PTA managed by the base station with respect to a PTA path between the base station and the base station controller in step 411. That is, the base station determines whether the PTA path between the base station and the base station controller with respect to the CID for multicast PTA is in a set state.

When determining that the obtained CID for multicast PTA exists in the list of CIDs for multicast PTA managed by the base station with respect to the PTA path between the base station and the base station controller in step 411, the base station determines that there is no abnormality in a set state of the PTA path between the base station and the base station controller, and ends the algorithm according to an exemplary embodiment of the present invention.

In contrast, when determining that the obtained CID for multicast PTA does not exist in the list of CIDs for multicast PTA managed by the base station with respect to the PTA path between the base station and the base station controller in step 411, the base station determines that there is abnormality in the set state of the PTA path between the base station and the base station controller and transmits a PTA path non-set state message with respect to the obtained CID for multicast PTA to the base station controller to inform that the PTA path between the base station and the base station controller with respect to the obtained CID for multicast PTA is in non-set state in step 413.

The base station determines whether a PTA path establishment message with respect to the CID for multicast PTA is received from the base station controller in step 415.

When determining that the PTA path establishment message with respect to the CID for multicast PTA is received from the base station controller in step 415, the base station inserts the obtained CID for multicast PTA into a list of CIDs for multicast PTA managed by the base station with respect to the PTA path between the base station and the base station controller to set the PTA path between the base station and the base station controller with respect to the obtained CID for multicast PTA in step 417.

In contrast, when determining that the KA_BR message is not received from the terminal during the transmission period via the uplink resource allocated to the terminal in step 407, the base station determines whether a CID for multicast PTA existing in the list of CIDs for multicast PTA managed by the base station with respect to the PTA path between the base station and the base station controller but not received via the KA_BR message during the transmission period from any terminal whatsoever exists in step 418. That is, the base station determines whether the PTA path between the base station and the base station controller with respect to the CID for multicast PTA is in an unnecessary state.

When determining that the CID for multicast PTA existing in the list of CIDs for multicast PTA managed by the base station with respect to the PTA path between the base station and the base station controller but not received via the KA_BR message during the transmission period from any terminal whatsoever exists in step 418, the base station determines that there is abnormality in a set state of a PTA transmission path between the base station and the base station controller, and transmits a PTA path unnecessary state message with respect to the existing CID for multicast PTA to the base station controller to inform that the PTA path between the base station and the base station controller with respect to the CID for multicast PTA is in the unnecessary state in step 419.

The base station determines whether a PTA path release message with respect to the existing CID for multicast PTA is received from the base station controller in step 421.

When determining that the PTA path release message with respect to the existing CID for multicast PTA is received from the base station controller in step 421, the base station deletes the existing CID for multicast PTA from the list of CIDs for multicast PTA managed by the base station with respect to the PTA path between the base station and the base station controller to release the PTA path between the base station and the base station controller with respect to the existing CID for multicast PTA in step 423.

In contrast, when determining that the CID for multicast PTA existing in the list of CIDs for multicast PTA managed by the base station with respect to the PTA path between the base station and the base station controller but not received via the KA_BR message during the transmission period from any terminal whatsoever does not exist in step 418, the base station ends the algorithm according to an exemplary embodiment of the present invention.

Figure 5A:
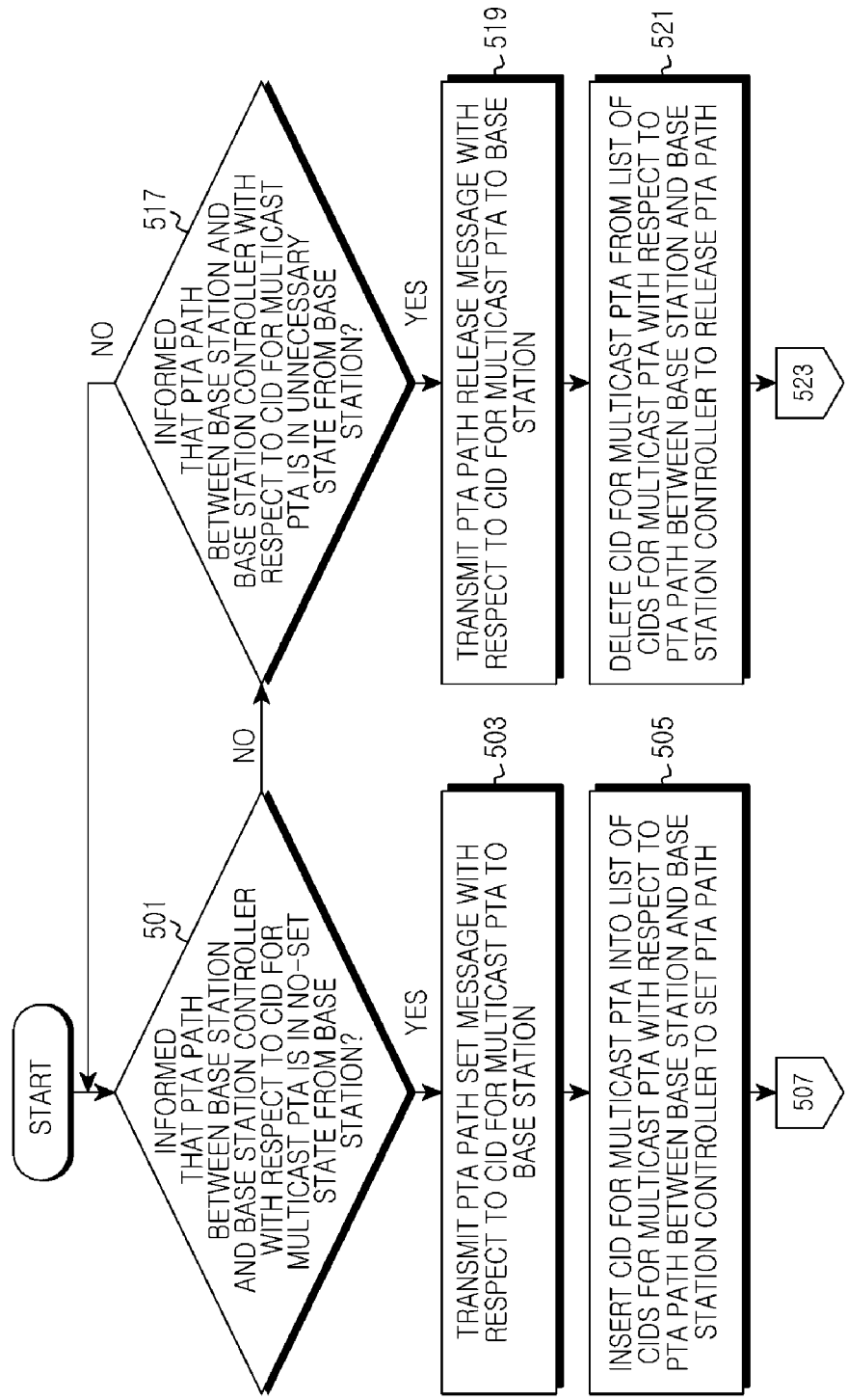
FIGS. 5A and 5B are flowcharts illustrating methods for operating a base station controller for managing an access state of a terminal for a group communication service in a wireless communication system according to an exemplary embodiment of the present invention.
Figure 5B:
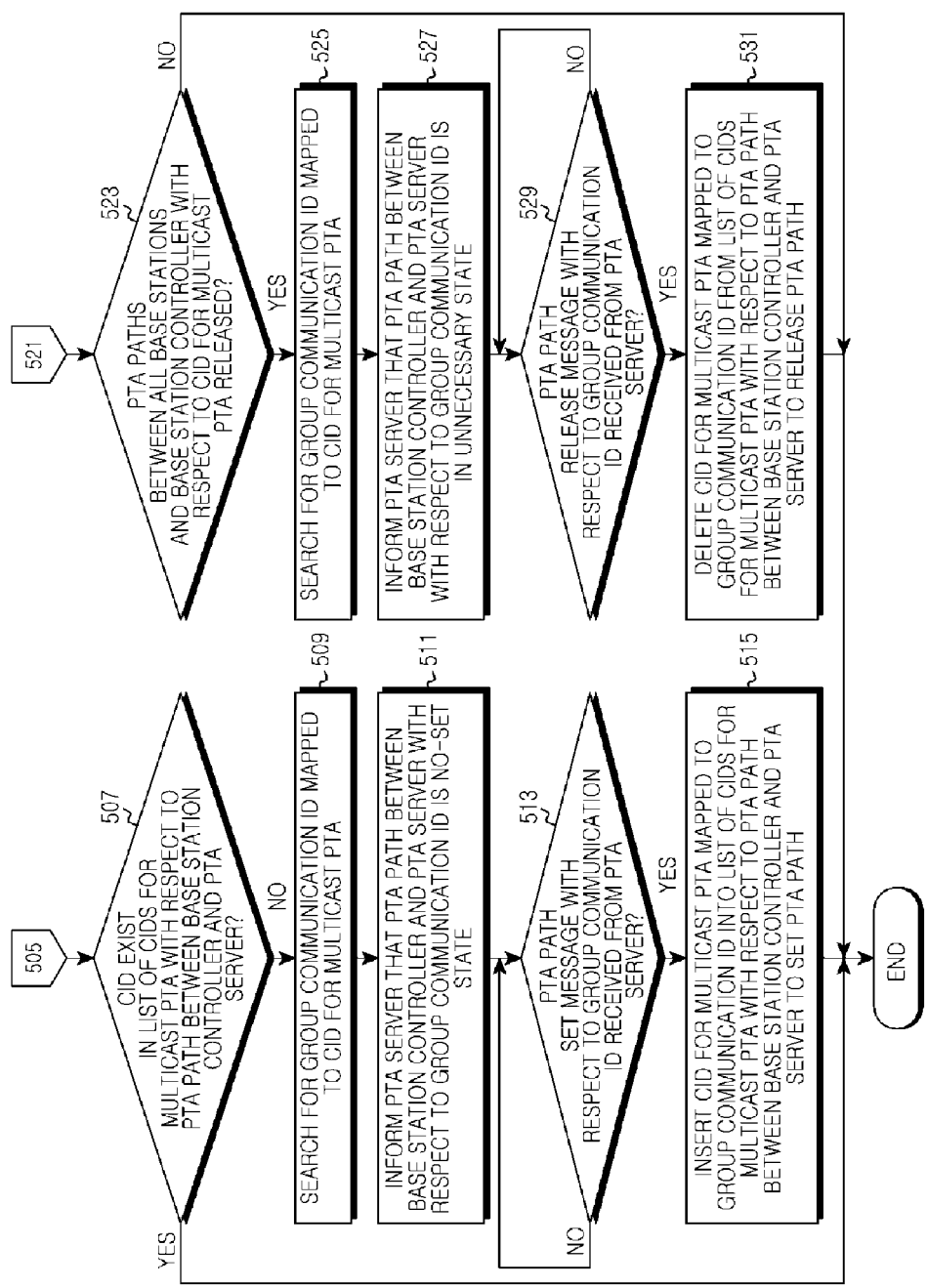

FIGS. 5A and 5B are flowcharts illustrating methods for operating a base station controller for managing an access state of a terminal for a group communication service in a wireless communication system according to an exemplary embodiment of the present invention.

Referring to FIGS. 5A and 5B, the base station controller determines whether it has been informed that the PTA path between the base station and the base station controller with respect to the CID for multicast PTA is in a non-set state via a PTA path non-set state message from the base station in step 501.

When determining that it has been informed that the PTA path between the base station and the base station controller with respect to the CID for multicast PTA is in the non-set state via the PTA path non-set state message from the base station in step 501, the base station controller transmits a PTA path establishment message with respect to the CID for multicast PTA to the base station in step 503.

The base station controller inserts the CID for multicast PTA into a list of CIDs for multicast PTA managed by the base station controller with respect to the PTA path between the base station and the base station controller in step 505 to set a PTA path between the base station and the base station controller with respect to the CID for multicast PTA. Though not shown, the base station controller determines whether the CID for multicast PTA exists in the list of CIDs for multicast PTA managed by the base station controller with respect to the PTA path between the base station and the base station controller, and when the CID for multicast PTA does not exist, the base station controller inserts the CID for multicast PTA into the list of CIDs for multicast PTA.

The base station controller determines whether the CID for multicast PTA exists in the list of CIDs for multicast PTA managed by the base station controller with respect to a PTA path between the base station controller and a PTA server. That is, the base station controller determines whether the PTA path between the base station controller and the PTA server with respect to the CID for multicast PTA is in a set state.

When determining that the CID for multicast PTA exists in the list of CIDs for multicast PTA managed by the base station controller with respect to the PTA path between the base station controller and the PTA server in step 507, the base station controller determines that there is no abnormality in a set state of the PTA transmission path between the base station controller and the PTA server, and ends the algorithm according to an exemplary embodiment of the present invention.

In contrast, when determining that the CID for multicast PTA does not exist in the list of CIDs for multicast PTA managed by the base station controller with respect to the PTA path between the base station controller and the PTA server in step 507, the base station controller determines that there is abnormality in the set state of the PTA transmission path between the base station controller and the PTA server, and searches for a group communication ID mapped to the CID for multicast PTA in step 509.

The base station controller transmits a PTA path non-set state message with respect to the searched group communication ID to the PTA server to inform that the PTA path between the base station controller and the PTA server with respect to the group communication ID is in a non-set state in step 511.

The base station controller determines whether a PTA path establishment message with respect to the group communication ID is received from the PTA server in step 513.

When determining that the PTA path establishment message with respect to the group communication ID is received from the PTA server in step 513, the base station controller inserts a CID for multicast PTA mapped to the group communication ID into the list of CIDs for multicast PTA managed by the base station controller with respect to the PTA path between the base station controller and the PTA server to set a PTA path between the base station controller and the PTA server with respect to the CID for multicast PTA in step 515.

In contrast, when determining that it has not been informed that the PTA path between the base station and the base station controller with respect to the CID for multicast PTA is in the non-set state via the PTA path non-set state message from the base station in step 501, the base station controller determines whether it has been informed that the PTA path between the base station and the base station controller with respect to the CID for multicast PTA is in an unnecessary state via a PTA path unnecessary state message from the base station in step 517.

When determining that it has not been informed that the PTA path between the base station and the base station controller with respect to the CID for multicast PTA is in the unnecessary state via the PTA path unnecessary state message from the base station in step 517, the base station controller returns to step 501 to repeatedly perform subsequent steps.

In contrast, when determining that it has been informed that the PTA path between the base station and the base station controller with respect to the CID for multicast PTA is in the unnecessary state via the PTA path unnecessary state message from the base station in step 517, the base station controller transmits a PTA path release message with respect to the CID for multicast PTA to the base station in step 519.

The base station controller deletes the CID for multicast PTA from the list of CIDs for multicast PTA managed by the base station controller with respect to the PTA path between the base station and the base station controller to release the PTA path between the base station and the base station controller with respect to the CID for multicast PTA in step 512. Though not shown, the base station controller determines whether the CID for multicast PTA exists in the list of CIDs for multicast PTA managed by the base station controller with respect to the PTA path between the base station and the base station controller, and when the CID for multicast PTA exists, the base station controller deletes the CID for multicast PTA from the list of CIDs for multicast PTA.

The base station controller determines whether PTA paths between all base stations and the base station controller with respect to the CID for multicast PTA have been released in step 523.

When determining that the PTA paths between all base stations and the base station controller with respect to the CID for multicast PTA have been released in step 523, the base station controller searches for a group communication ID mapped to the CID for multicast PTA in step 525, and transmits a PTA path unnecessary state message with respect to the searched group communication ID to a PTA server to inform that a PTA path between the base station controller and the PTA server with respect to the group communication ID is in an unnecessary state in step 527.

The base station controller determines whether a PTA path release message with respect to the group communication ID is received from the PTA server in step 529.

When determining that the PTA path release message with respect to the group communication ID is received from the PTA server in step 529, the base station controller deletes a CID for multicast PTA mapped to the group communication ID from the list of CIDs for multicast PTA managed by the base station controller with respect to the PTA path between the base station controller and the PTA server to release the PTA path between the base station controller and the PTA server with respect to the CID for multicast PTA in step 531.

In contrast, when not determining that the PTA paths between all base stations and the base station controller with respect to the CID for multicast PTA have been released in step 523, the base station controller ends the algorithm according to an exemplary embodiment of the present invention.

Figure 6:
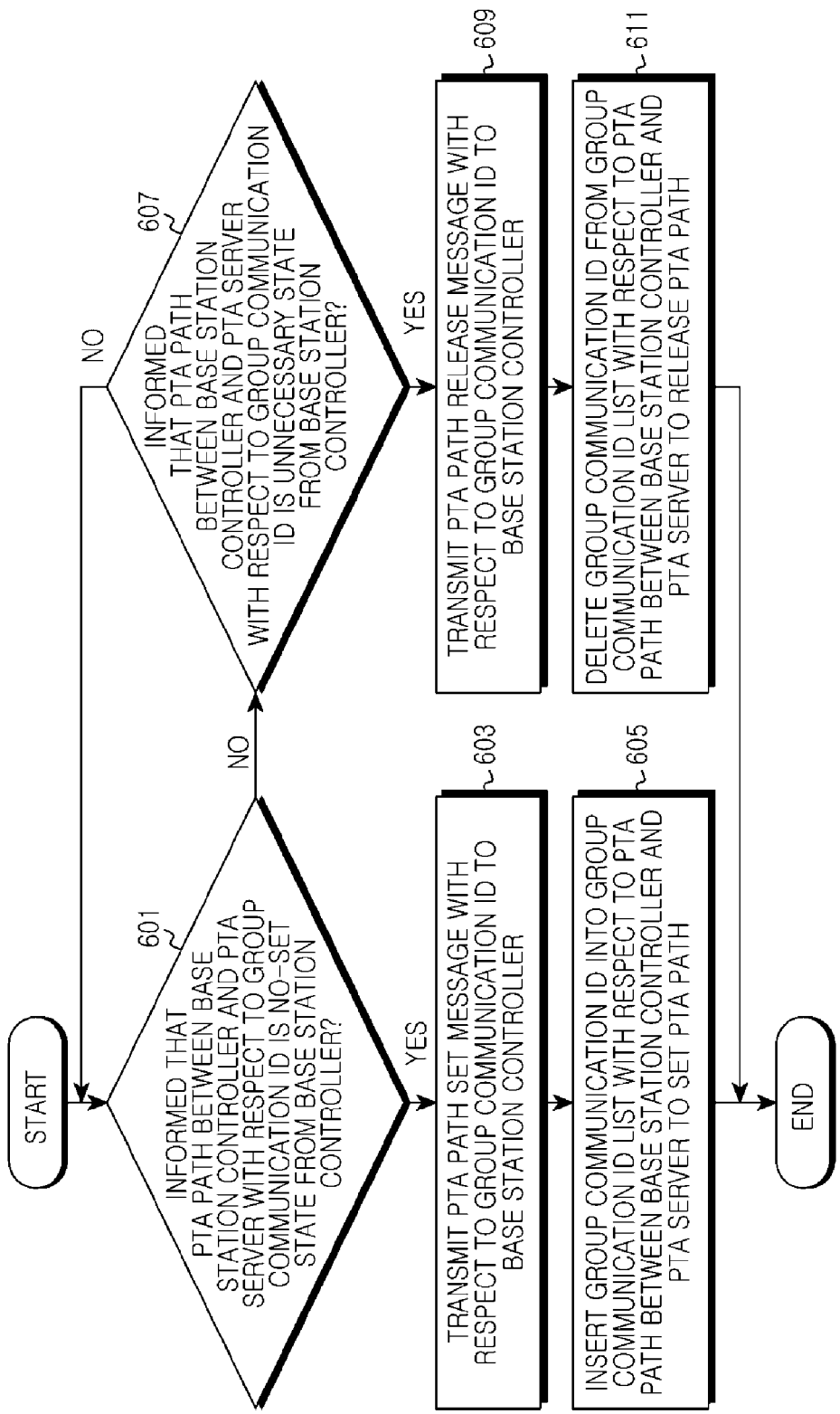
FIG. 6 is a flowchart illustrating a method for operating a PTA server for managing an access state of a terminal for a group communication service in a wireless communication system according to an exemplary embodiment of the present invention.

FIG. 6 is a flowchart illustrating a method for operating a PTA server for managing an access state of a terminal for a group communication service in a wireless communication system according to an exemplary embodiment of the present invention.

Referring to FIG. 6, the PTA server determines whether it has been informed that a PTA path between a base station controller and the PTA server with respect to a group communication ID is in a non-set state via a PTA path non-set state message from the base station controller in step 601.

When determining that it has been informed that the PTA path between the base station controller and the PTA server with respect to the group communication ID is in the non-set state via the PTA path non-set state message from the base station controller in step 601, the PTA server transmits a PTA path establishment message with respect to the group communication ID to the base station controller in step 603.

The PTA server inserts the group communication ID into a list of group communication IDs managed by the PTA server with respect to the PTA path between the base station controller and the PTA server to set the PTA path between the base station controller and the PTA server with respect to the group communication ID in step 605. Though not shown, the PTA server determines whether the group communication ID exists in the list of the group communication IDs managed by the PTA server with respect to the PTA path between the base station controller and the PTA server, and when the group communication ID does not exist, the PTA server inserts the group communication ID into the list of the group communication IDs.

In contrast, when determining that it has not been informed that the PTA path between the base station controller and the PTA server with respect to the group communication ID is in the non-set state via the PTA path non-set state message from the base station controller in step 601, the PTA server determines whether it has been informed that the PTA path between the base station controller and the PTA server with respect to the group communication ID is in an unnecessary state via a PTA path unnecessary state message from the base station controller in step 607.

When determining that it has been informed that the PTA path between the base station controller and the PTA server with respect to the group communication ID is in the unnecessary state via the PTA path unnecessary state message from the base station controller in step 607, the PTA server transmits a PTA path release message with respect to the group communication ID to the base station controller in step 609.

The PTA server deletes the group communication ID from the list of group communication IDs managed by the PTA server with respect to the PTA path between the base station controller and the PTA server to release the PTA path between the base station controller and the PTA server with respect to the group communication ID in step 611. Though not shown, the PTA server determines whether the group communication ID exists in the list of group communication IDs managed by the PTA server with respect to the PTA path between the base station controller and the PTA server, and when the group communication ID exists, the PTA server deletes the group communication ID from the list of group communication IDs.

After that, the PTA server ends the algorithm according to an exemplary embodiment of the present invention.

According to an exemplary embodiment of the present invention, a wireless communication system that supports a group communication service in a multicast method performs a Keep Alive procedure between a terminal and a base station in an idle state, and informs a PTA server or a base station controller of an abnormal phenomenon only when the abnormal phenomenon is generated to management of a transmission path for group communication, so that an amount of a load applied to the PTA server and the base station controller may be reduced.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A method for operating a terminal for a group communication service in a wireless communication system, the method comprising:
   transmitting a bandwidth ranging message to a base station in an idle state;
   receiving an uplink resource allocation from the base station;
   generating a message for access state transfer comprising a multicast Connection IDentifier (CID); and
   transmitting the message for access state transfer to the base station via the allocated uplink resource.

2. The method of claim 1, wherein the message for access state transfer is used as a keep alive message for group communication corresponding to the multicast CID, and comprises a bandwidth request message.

3. A method for operating a base station for a group communication service in a wireless communication system, the method comprising:
   receiving a bandwidth ranging message from a terminal in an idle state;
   allocating an uplink resource to the terminal; and
   receiving a message for access state transfer comprising a multicast Connection IDentifier (CID) via the allocated uplink resource from the terminal.

4. The method of claim 3, further comprising:
   determining whether the multicast CID exists in a multicast CID list managed by the base station with respect to a group communication path between the base station and a base station controller;
   when the multicast CID does not exist, transmitting a Push-To-All (PTA) path non-set state message comprising the multicast CID to the base station controller to inform that a group communication path between the base station and the base station controller with respect to the multicast CID is in a non-set state;
   determining whether a PTA path establishment message comprising the multicast CID is received from the base station controller; and
   when the PTA path establishment message comprising the multicast CID is received, inserting the multicast CID into the multicast CID list managed by the base station with respect to the group communication path between the base station and the base station controller to set the group communication path between the base station and the base station controller with respect to the multicast CID.

5. The method of claim 3, further comprising:
- determining whether a multicast CID not received via a message for access state transfer from any terminal whatsoever exists in a multicast CID list managed by the base station with respect to a group communication path between the base station and a base station controller;
- when the multicast CID exists, transmitting a PTA path unnecessary state message comprising the multicast CID to the base station controller to inform that a group communication path between the base station and the base station controller with respect to the multicast CID is in an unnecessary state;
- determining whether a PTA path release message comprising the multicast CID is received from the base station controller; and
- when the PTA path release message comprising the multicast CID is received, deleting the multicast CID from the multicast CID list managed by the base station with respect to the group communication path between the base station and the base station controller to release the group communication path between the base station and the base station controller with respect to the multicast CID.

6. A method for operating a base station controller for a group communication service in a wireless communication system, the method comprising:
- being informed via a Push-To-All (PTA) path non-set state message from a base station that a group communication path between the base station and the base station controller for a multicast Connection IDentifier (CID) is in a non-set state;
- transmitting a PTA path establishment message comprising the multicast CID to the base station; and
- inserting the multicast CID into a multicast CID list managed by the base station controller with respect to the group communication path between the base station and the base station controller to set the group communication path between the base station and the base station controller with respect to the multicast CID.

7. The method of claim 6, further comprising:
- determining whether the multicast CID exists in the multicast CID list managed by the base station controller with respect to a group communication path between the base station controller and a group communication server;
- when the multicast CID exists, transmitting a PTA path non-set state message comprising a group communication ID mapped to the multicast CID to the group communication server to inform that a group communication path between the base station controller and the group communication server with respect to the group communication ID is in a non-set state;
- determining whether a PTA path establishment message comprising the group communication ID is received from the group communication server; and
- when the PTA path establishment message comprising the group communication ID is received, inserting a multicast CID mapped to the group communication ID into the multicast CID list managed by the base station controller with respect to the group communication path between the base station controller and the group communication server to set a group communication path between the base station controller and the group communication server with respect to the multicast CID.

8. The method of claim 6, further comprising:
- being informed that the group communication path between the base station and the base station controller with respect to the multicast CID is in an unnecessary state via a PTA path unnecessary state message from the base station;
- transmitting a PTA path release message comprising the multicast CID to the base station; and
- deleting the multicast CID from the multicast CID list managed by the base station controller with respect to the group communication path between the base station and the base station controller to release the group communication path between the base station and the base station controller with respect to the multicast CID.

9. The method of claim 8, further comprising:
- determining whether group communication paths between all base stations and the base station controller with respect to the multicast CID have been released;
- when the group communication paths between all base stations and the base station controller with respect to the multicast CID have been released, transmitting a PTA path unnecessary state message comprising a group communication ID mapped to the multicast CID to the group communication server to inform that a group communication path between the base station controller and the group communication server with respect to the group communication ID is in an unnecessary state;
- determining whether a PTA path release message comprising the group communication ID is received from the group communication server; and
- when the PTA path release message comprising the group communication ID is received from the group communication server, deleting a multicast ID mapped to the group communication ID from the multicast CID list managed by the base station controller with respect to a group communication path between the base station controller and the group communication server to release a group communication path between the base station controller and the group communication server with respect to the multicast CID.

10. A method for operating a group communication server for a group communication service in a wireless communication system, the method comprising:
- being informed via a Push-To-All (PTA) path non-set state message from a base station controller that a group communication path between the base station controller and the group communication server with respect to a group communication IDentifier (ID) is in a non-set state;
- transmitting a PTA path establishment message comprising the group communication ID to the base station controller; and
- inserting the group communication ID into a group communication ID list managed by the group communication server with respect to the group communication path between the base station controller and the group communication server to set the group communication path between the base station controller and the group communication server with respect to the group communication ID.

11. The method of claim 10, further comprising:
- being informed that the group communication path between the base station controller and the group communication server with respect to a group communication ID is in a unnecessary state via a PTA path unnecessary state message from the base station controller;
- transmitting a PTA path release message comprising the group communication ID to the base station controller; and
- deleting the group communication ID from the group communication ID list managed by the group communication server with respect to the group communication path between the base station controller and the group communication server to release a group communication path between the base station controller and the group communication server with respect to the group communication ID.

12. An apparatus of a terminal for a group communication service in a wireless communication system, the apparatus comprising:
 a transmitter for transmitting a bandwidth ranging message to a base station in an idle state;
 a group communication manager for being allocated an uplink resource from the base station; and
 a message generator for generating a message for access state transfer comprising a multicast Connection IDentifier (CID),
 wherein the transmitter transmits the message for access state transfer to the base station via the allocated uplink resource.

13. An apparatus of a base station for a group communication service in a wireless communication system, the apparatus comprising:
 a receiver for receiving a bandwidth ranging message from a terminal in an idle state; and
 a group communication manager for allocating an uplink resource to the terminal,
 wherein the receiver receives a message for access state transfer comprising a multicast Connection IDentifier (CID) from the terminal via the allocated uplink resource,
 wherein the group communication manager determines whether the multicast CID exists in a multicast CID list managed by the base station with respect to a group communication path between the base station and a base station controller, when the multicast CID does not exist, transmits a Push-To-All (PTA) path non-set state message comprising the multicast CID to the base station controller to inform that a group communication path between the base station and the base station controller with respect to the multicast CID is in a non-set state, determines whether a PTA path establishment message comprising the multicast CID is received from the base station controller, and when the PTA path establishment message comprising the multicast CID is received, inserts the multicast CID into the multicast CID list managed by the base station with respect to the group communication path between the base station and the base station controller to set a group communication path between the base station and the base station controller with respect to the multicast CID, and
 wherein the group communication manager determines whether a multicast CID not received via a message for access state transfer from any terminal whatsoever exists in a multicast CID list managed by the base station with respect to a group communication path between the base station and a base station controller,
 when the multicast CID exists, transmits a PTA path unnecessary state message comprising the multicast CID to the base station controller to inform that a group communication path between the base station and the base station controller with respect to the multicast CID is in an unnecessary state,
 determines whether a PTA path release message comprising the multicast CID is received from the base station controller, and
 when the PTA path release message comprising the multicast CID is received, deletes the multicast CID from the multicast CID list managed by the base station with respect to the group communication path between the base station and the base station controller to release the group communication path between the base station and the base station controller with respect to the multicast CID.

14. An apparatus of a base station controller for a group communication service in a wireless communication system, the apparatus comprising:
 a receiver for being informed via a Push-To-All (PTA) path non-set state message from a base station that a group communication path between the base station and the base station controller with respect to a multicast Connection IDentifier (CID) is in a non-set state;
 a transmitter for transmitting a PTA path establishment message comprising the multicast CID to the base station; and
 a group communication manager for inserting the multicast CID into a multicast CID list managed by the base station controller with respect to the group communication path between the base station and the base station controller to set the group communication path between the base station and the base station controller with respect to the multicast CID, wherein the group communication manager determines whether the multicast CID exists in the multicast CID list managed by the base station controller with respect to a group communication path between the base station controller and a group communication server,
 when the multicast CID exists, transmits a PTA path non-set state message comprising a group communication ID mapped to the multicast CID to the group communication server to inform that a group communication path between the base station controller and the group communication server with respect to the group communication ID is in a non-set state;
 determines whether a PTA path establishment message comprising the group communication ID is received from the group communication server, and
 when the PTA path establishment message comprising the group communication ID is received, inserts a multicast CID mapped to the group communication ID into the multicast CID list managed by the base station controller with respect to the group communication path between the base station controller and the group communication server to set a group communication path between the base station controller and the group communication server with respect to the multicast CID, wherein the receiver is informed that the group communication path between the base station and the base station controller with respect to the multicast CID is in an unnecessary state via a PTA path unnecessary state message from the base station,
 the transmitter transmits a PTA path release message comprising the multicast CID to the base station, and
 the group communication manager deletes the multicast CID from the multicast CID list managed by the base station controller with respect to the group communication path between the base station and the base station controller to release the group communication path between the base station and the base station controller with respect to the multicast CID,
 wherein the group communication manager determines whether group communication paths between all base stations and the base station controller with respect to the multicast CID have been released, when the group communication paths between all base stations and the base station controller with respect to the multicast CID have been released, transmits a PTA path unnecessary state message comprising a group communication ID mapped to the multicast CID to the group communication server to inform that a group communication path between the base station controller and the group communication server with respect to the group communication ID is in an unnecessary state, determines whether a PTA path release message comprising the group communication ID is received from the group communication server, and when the PTA path release message comprising the group communication ID is received from the group communication server, deletes a multicast ID mapped to the group communication ID from the multicast CID list managed by the base station controller with respect to a group communication path between the base station controller and the group communication server to release a group communication path between the base station controller and the group communication server with respect to the multicast CID.

15. An apparatus of a group communication server for a group communication service in a wireless communication system, the apparatus comprising:

a receiver for being informed via a Push-To-All (PTA) path non-set state message from a base station controller that a group communication path between the base station controller and the group communication server with respect to a group communication IDentifier (ID) is in a non-set state;

a transmitter for transmitting a PTA path establishment message comprising the group communication ID to the base station controller; and a group communication manager for inserting the group communication ID into a group communication ID list managed by the group communication server with respect to the group communication path between the base station controller and the group communication server to set the group communication path between the base station controller and the group communication server with respect to the group communication ID, wherein the receiver is informed that the group communication path between the base station controller and the group communication server with respect to a group communication ID is in a unnecessary state via a PTA path unnecessary state message from the base station controller, the transmitter transmits a PTA path release message comprising the group communication ID to the base station controller, and the group communication manager deletes the group communication ID from the group communication ID list managed by the group communication server with respect to the group communication path between the base station controller and the group communication server to release a group communication path between the base station controller and the group communication server with respect to the group communication ID.

* * * * *